A. E. Smith,

Axle Box.

No. 3,401. Reissued Apr. 27, 1869.

Witnesses.
R. G. Williams
C. L. Barrett

Inventor.
Alpa E. Smith

N. PETERS, PHOTO-LITHOGRAPHER, WASHINGTON, D. C.

United States Patent Office.

ALFRED E. SMITH, OF BRONXVILLE, NEW YORK.

*Letters Patent No.* 28,207, *dated May* 8, 1860; *reissue No.* 3,401, *dated April* 27, 1869.

IMPROVEMENT IN AXLES FOR CARRIAGES.

The Schedule referred to in these Letters Patent and making part of the same.

*To all whom it may concern:*

Be it known that I, ALFRED E. SMITH, of Bronxville, Westchester county, and State of New York, have invented certain new and useful Improvements in the Manufacture of Malleable-Iron Axle-Box for Wagons, and other purposes and vehicles; and I do hereby declare the following to be a full description of the same.

The nature of my invention consists in a new and improved manufacture of malleable cast-iron axle-boxes for wagons, and other purposes and vehicles, by making the external and internal surfaces of the box of a fine, steel-like hardness, and yet leave the body of the metal to retain its toughness, or malleability, to resist fracturing by sudden concussions, as would be the case with ordinary chilled cast-iron boxes.

But to describe my invention more particularly, I will refer to the accompanying drawings, forming a part of this specification, the same letters of reference, wherever they occur, referring to like parts.

Figure 1:
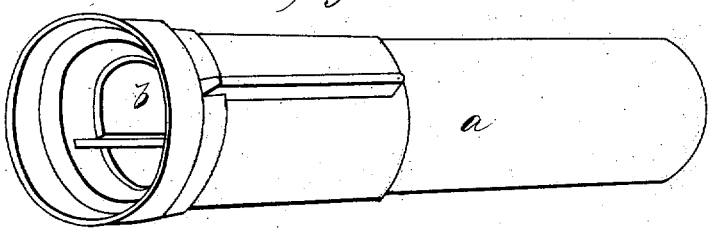
Figure 1 is a perspective view of the axle-box.
Figure 2:
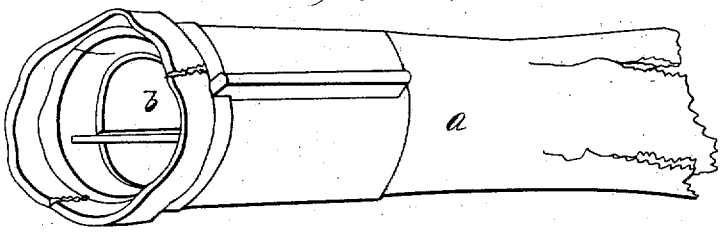
Figure 2 is a perspective view of an axle-box fractured by hammering, to exhibit the toughness of the body of the metal, notwithstanding its hardened surfaces, and as distinguishing it from chilled cast-iron axle-boxes.

Letter *a* represents the external, and *b*, the internal surfaces of the axle-box.

These boxes are cast of any size and pattern desired. They are then annealed, or converted into what is technically called malleable-iron boxes, by any of the common and well-known processes for that purpose. In this state they are put in the lathe, and turned, or finished up to the exact dimensions required for use.

Their surfaces are then hardened. For that purpose I have used a compound of prussiate of potash and common salt, at a red heat, in any suitable vessel, and immersed the heated box in it for about fifteen minutes.

They are then taken from the bath and plunged into a trough of cold water, when their surfaces become as hard as the finest-tempered steel, resisting the scratch of the file, and yet retaining in the body of the metal the toughness and malleability of wrought-iron, nearly, while at the same time preserving its accuracy of bore, or finished condition, except it be to polish them up with oil and emery to fit them for the market.

It will be observable, from this explanation, that my new manufacture of cast-iron case-hardened malleable axle-boxes differs from anything ever before known in the making of axle-boxes, in the following important particulars: first, it is a cast-iron box, and therefore can be made cheaply; second, it is malleable, and therefore has the toughness and durability of wrought-iron, but, as being made by casting, is made at much less cost than wrought-iron; third, it can be worked or finished for use in its malleable condition, and therefore takes less power in the lathe-work, and of course cheapens the labor, and lessens the wear of tools, than if worked or finished up from chilled cast-iron axle-boxes; fourth, the surfaces of the boxes are hardened only, but to a much greater extent than chilled cast-iron boxes can be hardened, and therefore are superior, as giving greater durability to the wear of the boxes; fifth, the body of the metal is tough, or malleable, and therefore differs from chilled cast-iron axle-boxes, inasmuch as the latter is always crude cast-iron, and easily fractured, while the former has been converted into a metal of a compound quality, that is, having the toughness of malleable iron, yet with surfaces of the hardness of the highest-tempered steel; sixth, the box being made malleable, is much lighter than chilled cast-iron axle-boxes can be made, and therefore is a great saving in metal, as well as obviating the necessity of cutting away so much wood from the centre of the hub, to admit its insertion therein, as is required by heavy chilled cast-iron axle-boxes.

Having now described my invention of a new manufacture of case-hardened malleable cast-iron axle-boxes, I will proceed to set forth what I claim and desire to secure by Letters Patent of the United States.

I claim, as my invention, the new and usefully-improved article of manufacture of case-hardened malleable cast-iron axle-boxes, by means of the operations hereinbefore described, or equivalents therefor, for the purpose of producing an article cheaper, more expeditiously, and of a better and more useful kind, than heretofore known.

ALFRED E. SMITH.

Witnesses:

CHARLES L. BARRITT,

FRANKLIN BARRITT.